3,007,052
MEASURING APPARATUS
Richard W. Hickman, Leo G. Mamas, and Frank M. Alexander, Columbus, Ohio, assignors to Industrial Nucleonics Corporation, a corporation of Ohio
Filed Dec. 3, 1958, Ser. No. 777,928
6 Claims. (Cl. 250—83.3)

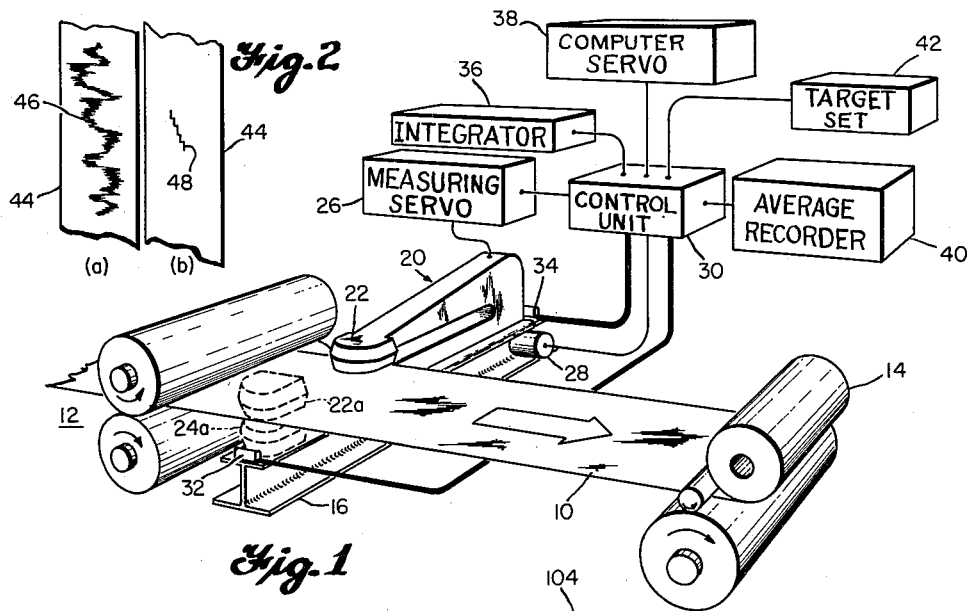
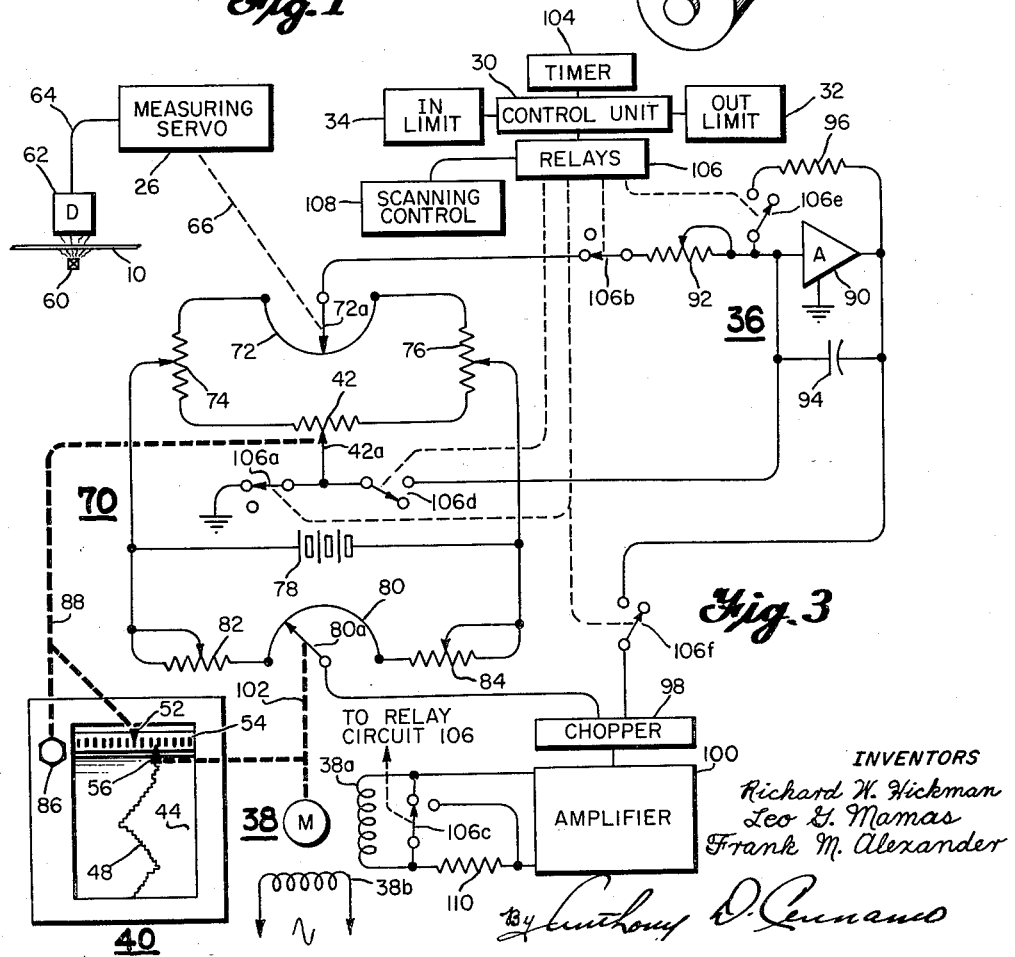

This invention relates to continuous web or sheet measuring apparatus, and more specifically to an improved system for recording the measurements in a novel menner such that the record facilitates the interpretation of the measurement and renders a more refined and concise data output from the raw data input.

The invention will be illustrated and described in connection with the measurement of traveling sheets issuing from a paper making machine, although it will be understood that the apparatus of the present invention may be readily adapted to other industrial processes. In industrial applications of this kind, it is desirable, for example, to maintain the basis weight of produced paper at a predetermined value. This value is determined according to the specifications of a given order, and is the target weight which affords the manufacturer the most economical results if accurately and consistently maintained. A reliable continuously measuring and recording gauge for basis weight is indispensable to the attainment of such results.

Recently, radiation gauging techniques have been developed which make possible very accurate measurements of basis weight, but the conventional recorder presentation of such measurements has not been entirely satisfactory. In one system presently employed, a gauging head is adapted to scan across the width of the sheet in one direction, generating an electrical signal indicative of the instantaneous weight per unit area variations of the sheet. These weight variations are graphically displayed upon a strip chart recorder. However, a chart record which reflects all the random and uncontrollable short-term variations characteristic of such processes makes it difficult among other things for operating personnel to accurately estimate the mean value of the sheet weight, or the deviation thereof from the specification.

In an attempt to levigate the confusing irregularities in the chart record, various damping devices have been employed in the mechanism or the electrical circuits of the chart recorder. However, such expedients merely attenuate the response of the recorder, and do not provide a discrete trace representing average basis weight. It is still necessary for the operator to interpret chart information containing considerable extraneous data in order to make proper adjustments to the paper making machine. It is apparent that a presentation thus requiring subjective interpretation is susceptible to varying degrees of human error.

Inasmuch as weight measurements are usually only taken during a scan in one direction, a considerable percentage of the total production is not recorded. Moreover, it has been found that a chart presentation which includes all the minute variations in the process requires a relatively fast chart speed. Consequently, the measurements recorded in a period of several hours, e.g., are spread out over a long section of chart on which all sections cannot be viewed simultaneously. Hence, the nature of long term trends or drifts in the process are not readily apparent from the record.

These and other disadvantages of prior recording methods are overcome by the novel technique set forth hereinbelow. In its broad utilitarian aspect the present invention provides means for producing a chart record consisting of a compact sequential presentation of short line segments parallel to the time axis of the chart. The lateral position of each line segment represents the average basis weight computed by averaging all instantaneous measured values obtained while the gauging head scans the sheet from one side to the other. The traversing gauge and the recorder are automatically programmed so that the gauging head traverses across the width of the sheet in one direction, the instantaneous basis weight measurements from the gauging head are integrated to obtain an average value thereof, and the average value is then recorded by a first line segment on the chart as above set forth. Thereupon the gauging head returns across the sheet in the opposite direction and again an intgareted average is taken and recorded as another line segment following the first. This action is continually and automatically repeated, resulting in an accurate, comprehensive and easily interpreted record whose utility and convenience are apparent on inspection of an example illustrated herein.

In its more detailed aspects, the present invention provides in conjunction with the recorder a novel electrical analog computer system adapted to the unique requirements of the disclosed recording method, and to the characteristics of the process measuring instruments employed.

For various reasons understood by those skilled in the art but which are beyond the necessary scope of this specification, process measuring instruments of the type described do not per se provide an electrical analog of the measured process variable. These instruments do provide as a very accurate analog a positioning of a servo motor driven slidewire potentiometer which is ordinarily mechanically coupled to an arbitrarily calibrated recorder scale and associated recorder chart.

The present system in a preferred embodiment thereof provides a servo computer including a repeat slidewire potentiometer mechanically coupled to and driven by the measuring servo. The slidewire potentiometer tap provides a first electrical analog voltage indicative of the instantaneous position of the servo, which in turn indicates the instantaneous value of the measured variable.

There is further provided a target-set control comprising a manually adjustable potentiometer connected into a bridge circuit which includes the aforementioned repeat slidewire. The target potentiometer tap provides a second analog voltage representing a selected value of the measured variable.

The system further includes an electronic integrator having an input which receives the difference between the said first and second analog voltages while the gauging head is traversing across the width of the sheet. The output of the integrator thereafter provides a third analog voltage representing the mean, or average deviation of the measured value from the selected value.

When a scan across the sheet has been completed, the servo computer receives the third analog voltage and adds thereto the second analog voltage representing the selected value aforesaid. The sum is then converted by means of a motor driven servo rebalancing device to a corresponding position of the pen and pointer mechanism of the recorder. This position represents the average value of the measured variable during the scan.

A timer inactivates the gauging head positioning mechanism and maintains the circuit connections for the last mentioned computer operation for a period of time sufficient to complete the rebalancing of the servo, then "clamps" the recorder pen and pointer at the rebalanced position and resets the integrator. The timer then initiates a repetition of the above-listed operations as the gauge is allowed to scan the sheet in the opposite direction. During the return scan, the recorder pen and pointer are allowed to remain in the rebalanced position aforesaid, so as to record on the chart a line segment as above described.

Accordingly, it is a primary object of the present invention to provide a method and means for accurately indicating the average basis weight of a paper sheet.

It is another object to provide direct readout of the average basis weight of a paper sheet.

It is still another object to provide method and means for displaying the average basis weight record of a longer run of total paper production than heretofore possible.

It is a further object of the present invention to provide operating personnel with an improved method and means to facilitate visual determination of long term trends in basis weight variations of a paper making process.

It is yet another object of the present invention to provide an improved average basis weight indicating system for eliminating rapid variations of trace from a recorder chart making it significantly easier to interpret than similar devices used heretofore.

It is an additional object of the present invention to provide an average basis weight readout system that is easily adapted to various industrial processes engaged in sheet production.

Further advantages and features of the present invention will become more apparent upon reference to the subsequent specification taken in conjunction with the accompanying drawings, in which:

FIG. 1 is a diagrammatic perspective view of an average basis weight measuring and recorder readout system comprising one preferred embodiment of the present invention;

FIG. 2 is a view of two chart records for purposes of comparing the present invention with the prior art; and FIG. 3 is a schematic circuit diagram partially diagrammatic for illustrating the detailed operation of the apparatus of FIG. 1.

With specific reference to FIG. 1, a section of a paper manufacturing process is illustrated as an example of a particular application of the present invention. In a typical paper making process, a continuous sheet 10 is drawn through a stack of calender rolls generally indicated at 12 and onto a windup roll indicated at 14. A non-contacting basis weight gauge is located between the calender rolls 12 and the windup roll 14 for traversing the width of sheet 10 on a rail 16. The gauge comprises a U-bracket 20 carrying a housing 22 on the upper arm thereof. A similar housing is carried by the lower arm of the U-bracket 20 in vertical alignment with the upper housing 22. In the view depicted in FIG. 1, the lower housing is only visible in the position of the U-bracket 20 which places said housing in the position designated as 24a. Although the entire U-bracket 20 moves across the sheet 10, for purposes of clarity, only the inspection heads are shown in the moved position indicated in dotted outline. The lower housing 24a contains a nuclear radiation source which directs a beam of penetrative radiation toward the sheet 10. A radiation detector such as an ion chamber located in the upper housing 22 receives radiant energy passing upwardly through the sheet 10. In the well-known manner, a basis weight functional voltage is developed by the detector and coupled to a measuring servo located at 26.

A traversing motor 28 is operative to drive the U-bracket 20 back and forth across the sheet 10 in response to start, stop and reverse motor switching operations performed in a control unit 30. A microswitch 32 mounted on the rail track 16 is adapted to be actuated by movement of the U-bracket 20 to signal the limit of out-scan to the control unit 30. A similar switch 34 is utilized to signal the limit of in-scan. An integrator 36, computer servo 38, an average recorder 40 and a target set unit 42 are also connected into the control unit 30 for accomplishing the objects of the present invention. Briefly, these units function as hereinbefore set forth to provide only direct readout of average basis weight. A more detailed description of their operation will be provided hereinafter.

As the sheet 10 is scanned, a signal is produced by the measuring servo 26 which varies in accordance with the instantaneous basis weight variations of the sheet. Inasmuch as the measuring technique employed at 26 may be that described in U.S. Patent No. 2,790,945, issued April 30, 1957, to H. R. Chope, a description thereof will be omitted from this specification. Before the present invention, it has been common practice to couple the measuring servo 26 directly to a strip chart recorder in order to indicate the measured variable. A section of recorder chart 44 is shown at FIG. 2a as an example of such an indication. Briefly referring to FIG. 2a, numerous short term variations 46 are inscribed upon the chart 44 as an example of five consecutive scans across the sheet 10. It will be apparent that the mean value of all the indicated short term variations 46 is not readily observed. The present invention proposes to eliminate the confusing irregularities from the chart 44 while at the same time making it easier for personnel to determine the average value of sheet weight.

The improved chart presentation produced by the apparatus of FIG. 1 may be observed by referring to FIG. 2b. In FIG. 2b, a trace 48 represents a convenient condensation of the information plotted in FIG. 2a. Trace 48 essentially comprises a series of stepped portions of equivalent vertical dimension corresponding in time to the duration of each scan of the U-bracket 20. The lateral displacement of each step across the chart 44 is indicative of the average basis weight as calculated by the integrator 36 and the computer servo 38. It should be herein noted that for purposes of apt comparison, the chart records of FIG. 2 are representative of weight measurements of an identical portion of sheet 10. Thus, it may be seen that since minute variations of instantaneous weight are not recorded by the apparatus of FIG. 1, a much slower chart speed may be utilized by the average recorder 40. With the present invention, then, a much smaller section of the chart 44 is required for measurement of a given length of sheet 10. It will also be apparent from FIG. 2 that in determining average basis weight a higher degree of accuracy may be attained by utilizing the principles of the present invention.

For the purpose of providing a more detailed explanation of the operation of the foregoing apparatus, FIG. 3 may now be considered. In FIG. 3 a radioactive source 60 is disposed adjacent the sheet 10 for directing radiant energy toward a detector 62 arranged on the opposite side of said sheet. A conductor 64 serves to deliver generated electrical signals translatable to sheet basis weight to the measuring servo 26. A computer bridge 70 includes a repeat slideware potentiometer 72 connected by means of potentiometers 74 and 76 to a target potentiometer 42, a source of bridge potential represented by the battery 78 connected to the adjustable taps of the potentiometers 74 and 76, a recorder slideware 80, and a pair of potentiometers 82 and 84 serving to connect the recorder slidewire potentiometer 80 to the battery 78. The measuring servo 26 is mechanically coupled to the movable arm 72a of the repeat slidewire as indicated by the dotted line 66. The setting of the tap 42a of the target potentiometer is determined by a target adjust knob 86 which is provided on the front panel of the average recorder 40 for the convenience of operating personnel. A movable target indicator 52 is coupled to the knob 86 by the mechanical linkage indicated at 88. The indicator 52 may be manually positioned across a recorder scale 54 which may be suitably calibrated in units of basis weight, e.g., pounds per ream.

Movable tap 72a of the repeat slidewire is electrically connected via a set of relay contacts 106b to the integrator 36. In a preferred form, integrator 36 comprises a stabilized operational amplifier 90 utilizing an inverse feedback principle, an input resistor 92, a capacitor 94 connected between the input and output terminals of said amplifier, and a resistor 96 adapted to shunt said capacitor when a set of relay contacts 106e is closed.

The adjustable tap 80a of the recorder slidewire is connected to one terminal of a D.C. chopper 98. The integrator 36 may be connected to another terminal of the chopper 98 by a set of relay contacts 106f. In a well known manner, chopper 98 produces an alternating output having one of two directly opposite phases in accordance with the polarity of D.C. potential existing across its input terminals. Circuitry generally shown at 100 serves to amplify the alternating output of the chopper 98. The output of amplifier 100 is in turn connected to a sense winding 38a of the computer servo motor 38 which may be of the two phase type. The servo motor 38 may be geared to the movable arms 80a as shown by the heavy dotted line 10. In addition, it may be desirable to mechanically couple a recording indicator 56 of the average recorder 40 to the servomotor 38 to provide visual indication of the position of the tap 80a on the recorder slidewire.

In order to program the various functions of the disclosed apparatus, a timer 104 is provided. The control unit 30 is adapted to selectively energize a bank of relays at 106 at the direction of the timer 104, the in-limit switch 34 and the out-limit switch 32. Individual contacts of the relay circuit 106 which perform sequential switching functions are distinguishable by dissimilar lower case letters. Relays 106 also actuate a scanning control 108 for reversing the traversing motor 28 at the end of each scan.

In the operation of the hereinabove disclosed apparatus, the operator adjusts the target knob 86 until the pointer 52 indicates the desired basis weight upon the scale 54. Initially, the arm 42a of the target potentiometer is grounded by contacts 106a, the computer bridge 70 is connected via contacts 106b to the integrator 36, and the input to the chopper 98 is opened by a set of relay contacts 106f. The sense winding 38a of the computer servo motor is shorted by contacts 106c to eliminate movement of the recording indicator 56. At this time, a resistor 110 provides a load for the amplifer 100. When the traversing motor 28 is energized, the U-bracket 20 will begin to scan the sheet 10. Arm 72a will be moved across the repeat slidewire 72 in accordance with variations in the measured weight of the sheet 10. A varying potential indicative of instantaneous deviation in sheet weight from the aforesaid desired basis weight is thereby developed on the arm 72a and transmitted to the integrator 36. By the time the U-bracket 20 has traversed the width of the sheet 10, a potential will exist across the capacitor 94 which is proportional to the average value of the sheet weight deviations occurring during such traverse.

At the end of the scan, contacts 106a and 106b open to respectively lift the target arm 42a from ground and disconnect the input of the integrator 36 from the computer bridge 70. The capacitor 94 is connected between the target arm 42a and the input of the chopper 98 by the contacts 106d and 106f. A change of state of contacts 106c is then effected to enable the computer servo motor 38. Depending on the position of the arm 80a of the recorder slidewire, there may be a detectable voltage present at the input to the chopper 98. In a well known manner, this voltage causes the computer servo motor 38 to reposition the arm 80a in order to substantially eliminate any input signal to the chopper 98. Of course, the recording indicator 56 will be concomitantly relocated on the scale 54 at the new value of average sheet weight.

After a period of time sufficient to attain the bridge balance condition, timer 104 causes the contacts 106c to revert to their original position whereby the resistive load 110 is placed across the output of amplifier 100 as the motor winding 38a is again shorted. Thus, the indicator 56 is secured to its newly established position. After the capacitor 94 has been disconnected from the target arm 42a by the contacts 106d and from the chopper 98 by contacts 106f, resetting of the integrator 36 is accomplished by momentarily closing contacts 106e to discharge the capacitor 94 through the resistor 96. Contacts 106a and 106b are then closed to establish the original conditions. Next, by means of the timer 104, the scanning control 108 is directed to reverse the traversing motor 28. The U-bracket 20 starts a return scan whereupon the above recited sequence is repeated.

The present invention is described in conjunction with a particular application and as utilizing specific apparatus. Nevertheless, the disclosure should be recognized merely as one example since several modifications may be made therein without departing from the spirit and scope of the present invention or sacrificing any of its attendant advantages.

What is claimed is:

1. Apparatus for recording values of a cross-sectional dimension of a traveling sheet, comprising a recorder having a longtiudinally moving display chart and a marking indicator laterally movable with respect to said chart, a traversing gauge for continuously providing a first signal indicative of said dimension at the traversing point of measurement, drive means for moving said gauge at a uniform rate across the width of said sheet in a first direction, integrator means receiving said first signal for providing a second signal indicating the average value thereof, means for stopping said gauge when said width has been traversed, means for positioning said marking indicator on said chart in accordance with the value of said second signal, control means for reversing said drive means so as to return said gauge across said sheet when said indicator has been positioned on said chart, and means for maintaining said indicator position during said return movement of said gauge.

2. Apparatus as set forth in claim 1 including programmed switching means for resetting said integrator means when said indicator has been positioned on said chart and for enabling said integrator means to repeat said averaging operation to again obtain an average value during said return.

3. Apparatus for recording values of a cross-sectional dimension of a traveling sheet, comprising a recorder having a longitudinally moving display chart and a marking indicator movable laterally with respect to said chart, a traversing gauge for continuously providing a signal indicative of said dimension at the traversing point of measurement, drive means for moving said gauge at a uniform rate across the width of said sheet in a first direction, means for selecting a desired value of said dimension, means for generating a first voltage analog of said desired value, circuit means for generating a second voltage analog of said dimension at the traversing point of measurement, means for integrating the difference between said first and said second voltage analogs to provide a signal indicative of the average of said difference, means for stopping said gauge when said width has been traversed, means for positioning said marking indicator on said chart in accordance with said average difference value, control means for reversing said drive means so as to return said gauge across said sheet when said indicator has been positioned on said chart, and means for maintaining said indicator position during said return movement of said gauge.

4. Apparatus substantially as set forth in claim 3 wherein said control means includes means for resetting said integrating means when said indicator has been positioned on said chart, means enabling said integrator to again obtain an average value of said dimension during said gauge return, means for stopping said gauge return when said width has been traversed, means for re-positioning said indicator upon said chart in accordance with said last-mentioned average value, means for energizing said drive means to again move said gauge across said sheet in said first direction when said indicator has been re-positioned, means for maintaining said last-mentioned indicator position during said last-mentioned movement, and means for continually repeating the aforesaid operations.

5. Apparatus for recording average values of a cross-sectional dimension of traveling sheet, comprising a recorder having a continuously moving display chart subdivided in units of said dimension and a marking indicator movable with respect to said chart, a source of penetrative radiation and a radiation detector located at one edge of said sheet, means supporting said source to provide a beam of radiation directed toward one side of said traveling sheet and for supporting said detector in position to receive radiation from said sheet, a track extending laterally across the width of said sheet, a carriage including said source and detector supporting means, bearing means for movably supporting said carriage on said track, reversible motor means for actuating movement of said carriage, control means including means responsive to the position of said carriage on said track to periodically start, stop and reverse said motor means when said carriage has traversed said sheet, delay means connected to said control means for stopping said gauge for a predetermined period, a movable target indicator, means for positioning said target indicator on said chart at a desired value of said dimension, means responsive to said positioning means for generating a first voltage analog of said desired value, means including said detector for generating a second voltage analog of said dimension at the traversing point of measurement, circuit means for comparing said first and said second voltage analogs to provide a signal indicative of the difference therebetween, an integrator having an input adapted for connection to said circuit means and an output adapted for connection to said recorder, said integrator being operative to provide a signal indicative of an average value of said difference, means responsive to said control means for connecting said integrator output to said recorder when said motor means is deenergized for displacing said marking indicator on said chart from said target indicator a distance in accordance with said average difference, means for deenergizing said recorder to clamp said marking indicator on said chart at said displaced position, and means for automatically resetting said integrator, said control means adapted to actuate said reversible motor means when said integrator is reset.

6. In the combination of an apparatus for gauging a cross-sectional dimension of a laterally extended, traveling sheet, which apparatus includes a gauging device having a gauging head adapted to repeatedly scan said sheet to-and-fro across the width thereof for providing a signal indicative of said dimension, a recorder having a longitudinally moving display chart and a marking device laterally movable with respect to said chart for registering the value of such a signal, the improvement of means for increasing the significance and readability of the trace produced by said marking device on said chart, which comprises means for computing the average value of said signal during the scanning movement of said gauging head from one side to the other of said sheet, means energized at the end of said scanning movement for driving said marking device to the lateral position on said chart representing said average value, and means for maintaining said marking device at said lateral position during the next scanning movement of said gauging head.

References Cited in the file of this patent

UNITED STATES PATENTS

| | | |
|---|---|---|
| 2,750,986 | Russell et al. | June 19, 1956 |
| 2,866,899 | Busignies et al. | Dec. 30, 1958 |
| 2,866,900 | Busignies et al. | Dec. 30, 1958 |
| 2,889,463 | Linsert et al. | June 2, 1959 |
| 2,920,206 | Heller | Jan. 5, 1960 |